(12) United States Patent
Lee et al.

(10) Patent No.: US 9,626,144 B2
(45) Date of Patent: Apr. 18, 2017

(54) COMPUTER SYSTEM

(71) Applicant: LG ELECTRONICS INC., Seoul (KR)

(72) Inventors: Jihye Lee, Seoul (KR); Junghyun Lee, Seoul (KR); Kwangho Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 85 days.

(21) Appl. No.: 14/660,529

(22) Filed: Mar. 17, 2015

(65) Prior Publication Data

US 2016/0085495 A1   Mar. 24, 2016

(30) Foreign Application Priority Data

Sep. 23, 2014 (KR) .................. 10-2014-0126944

(51) Int. Cl.
  *G06F 3/14* (2006.01)
  *G06F 13/38* (2006.01)
  *H04L 12/24* (2006.01)

(52) U.S. Cl.
  CPC .............. *G06F 3/14* (2013.01); *G06F 13/385* (2013.01); *H04L 41/22* (2013.01)

(58) Field of Classification Search
  CPC .......... G06F 3/0634; G06F 3/10; G06F 3/385; G06F 3/14
  See application file for complete search history.

(56) References Cited

U.S. PATENT DOCUMENTS

| | | | | |
|---|---|---|---|---|
| 5,850,340 | A * | 12/1998 | York .................. | H04N 5/4401 345/158 |
| 5,886,695 | A * | 3/1999 | Chew .................. | G06F 9/4443 715/784 |
| 6,941,518 | B2 * | 9/2005 | French .............. | G06F 9/4416 709/223 |
| 2007/0088780 | A1 * | 4/2007 | Sato .................. | H04L 61/2015 709/204 |
| 2009/0268093 | A1 * | 10/2009 | Ishihara .............. | H04N 7/18 348/564 |
| 2011/0242492 | A1 * | 10/2011 | Jung .................. | G09F 9/33 353/30 |

* cited by examiner

*Primary Examiner* — Farley Abad
(74) *Attorney, Agent, or Firm* — Birch, Stewart, Kolasch & Birch, LLP

(57) ABSTRACT

A computer system includes a display, a user input interface connected to at least one input device, an external device interface for exchanging data with an external device, a network interface for connection to a wired/wireless network, and a controller for, when electronic devices connected to the same network are detected in a booting, controlling the display to display a dual control screen for a dual control mode for control of the detected electronic devices through the input device. Accordingly, it is possible to provide a user interface environment in which several electronic devices may be controlled by an input device used in one of the electronic devices and the other electronic devices may be easily controlled by the input device, thereby enhancing user convenience.

16 Claims, 15 Drawing Sheets

COMPUTER SYSTEM

CROSS-REFERENCE TO RELATED APPLICATION

This application claims the priority benefit of Korean Patent Application No. 10-2014-0126944, filed on Sep. 23, 2014 in the Korean Intellectual Property Office, the disclosure of which is incorporated herein by reference.

BACKGROUND OF THE INVENTION

1. Field of the Invention

The present invention relates to a computer system, and more particularly to a computer system capable of controlling a plurality of electronic devices through one input device, and a method of operating the same.

2. Description of the Related Art

A computer system, such as a desktop personal computer (PC) or a notebook computer, and an electronic device, such as a mobile terminal, a television (TV) or a multimedia player, have diversified in function according to digital convergence and hybridization. In addition, linked functions and operations of electronic devices have increased in number.

Research is being actively conducted into a technology which enables one user or a group of users to simultaneously interconnect and use a plurality of electronic devices or to simultaneously control the plurality of electronic devices.

Moreover, there is an increasing user demand to control, through an input device used in any one electronic device, another electronic device.

SUMMARY OF THE INVENTION

Therefore, the present invention has been made in view of the above problems, and it is an object of the present invention to provide a computer system capable of controlling a plurality of electronic devices through an input device used in any one electronic device, and a method of operating the same.

In accordance with an aspect of the present invention, the above and other objects can be accomplished by the provision of a computer system including a display, a user input interface connected to at least one input device, an external device interface for exchanging data with an external device, a network interface for connection to a wired/wireless network, and a controller for, when electronic devices connected to the same network are detected in a booting, controlling the display to display a dual control screen for a dual control mode for control of the detected electronic devices through the input device.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Exemplary embodiments of the present invention will be described with reference to the attached drawings.

The terms "module" and "unit" used in description of components are used herein to aid in understanding of the components and thus should not be misconstrued as having specific meanings or roles. Accordingly, the terms "module" and "unit" may be used interchangeably.

Figure 1:
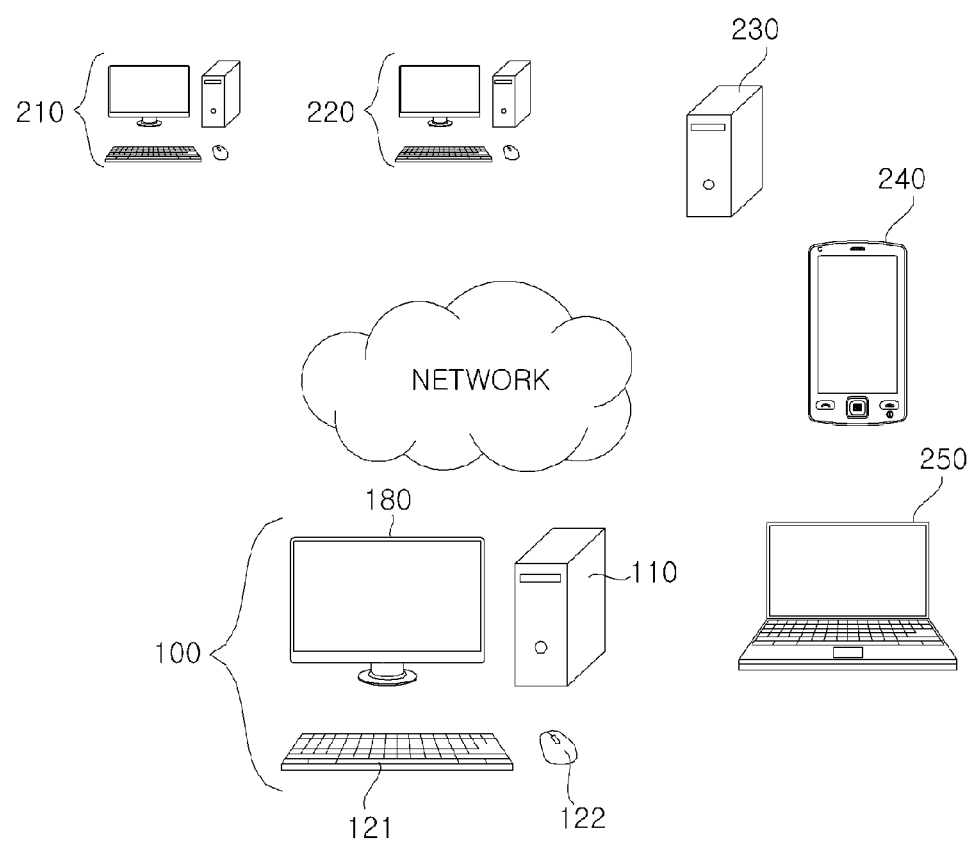
FIG. 1 is a view illustrating a computer system and electronic devices connected through a network.

FIG. 1 illustrates a computer system and electronic devices connected through a network.

Referring to FIG. 1, a computer system 100 according to an embodiment of the present invention may be connected to various electronic devices through a wired/wireless network.

For example, the computer system 100 may be connected to other computer systems 210 and 220, a personal computer (PC) or server 230, a smartphone 240, and a notebook computer 250 through a wired/wireless Internet network.

In addition, the computer system 100 according to the present embodiment may be directly connected to the electronic devices such as the other computer systems 210 and 220, the PC or server 230, the smartphone 240, and the notebook computer 250 through a cable such as a universal serial bus (USB) cable.

The computer system 100 according to the present embodiment may exchange data with the electronic devices connected through the network, and perform linked functions and operations of the electronic devices.

Like a computer system such as a PC, the computer system 100 according to the present embodiment may include a PC main unit 110, an input device such as a keyboard 121 or a mouse 122, and an output device such as a display 180 or a speaker.

Figure 2:
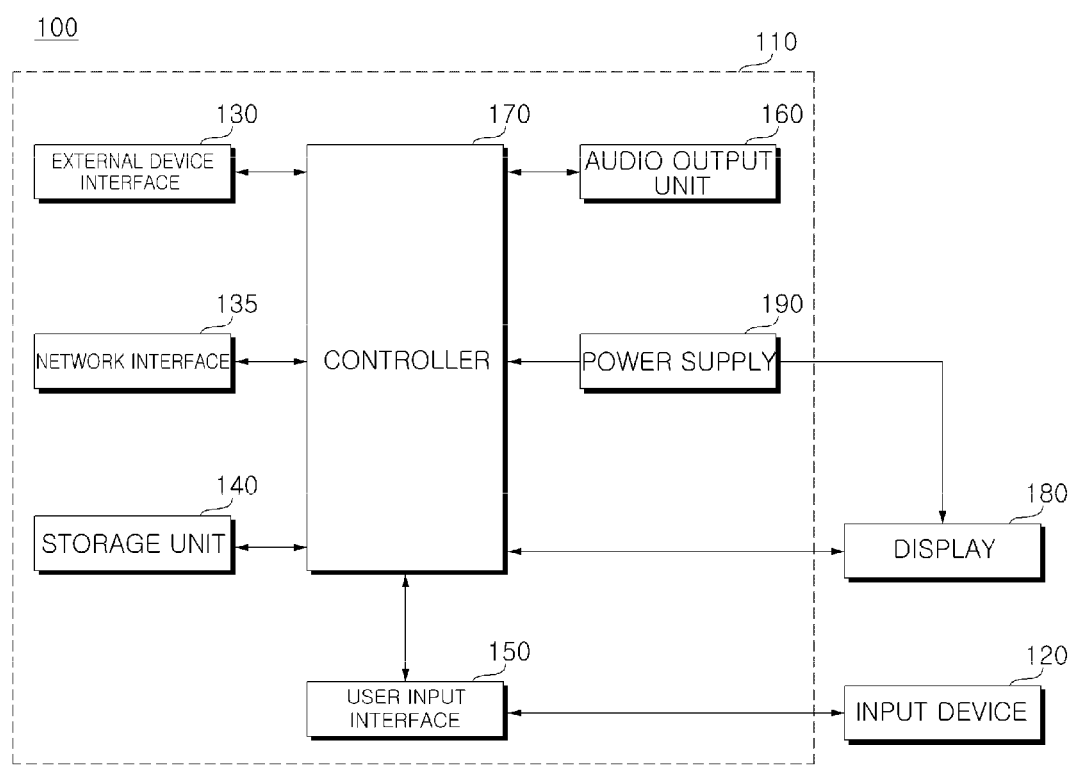
FIG. 2 is a block diagram showing an internal configuration of the computer system according to an embodiment of the present invention.

FIG. 2 is a block diagram showing an internal configuration of the computer system 100 according to the present embodiment.

Referring to FIG. 2, the PC 110 of the computer system 100 according to the present embodiment may include an external device interface 130, a network interface 135, a storage unit 140, a user input interface 150, an audio output unit 160, a controller 170, and a power supply 190.

The computer system 100 according to the present embodiment may include the PC 110, the input device, denoted by reference numeral 120, and the display 180. The PC 110 and the display 180 may be provided as an integrated body.

The external device interface 130 may be connected to an external device such as a television (TV), a monitor, a smartphone, a mobile terminal, a digital versatile disc (DVD) player, a Blu-Ray player, a game console, a camera, a camcorder, a computer (notebook computer), or a set-top box either by wire or wirelessly to perform an input/output operation with the external device.

To this end, the external device interface 130 may include an audio/video (A/V) input/output unit (not shown) or a wireless communication unit (not shown). In addition, the external device interface 130 may include a USB terminal, a composite video banking sync (CVBS) terminal, a component terminal, a super-video (S-video) terminal, a digital visual interface (DVI) terminal, a high-definition multimedia interface (HDMI) terminal, a red-green-blue (RGB) terminal, and a D-subminiature (D-SUB) terminal.

The network interface 135 serves as an interface for connecting the computer system 100 to the wired/wireless network including the Internet. For example, the network interface 135 may receive a content or data provided by the Internet, a content provider, a network operator or an electronic device through the network. The network interface 135 may also transmit a content or data to electronic devices.

The storage unit 140 may store a program for processing and control of each signal in the controller 170, and a video, audio or data signal subjected to signal processing.

In addition, the storage unit 140 may perform a function of temporarily storing a video, audio or data signal input from the external device interface 130.

FIG. 2 illustrates an example in which the storage unit 140 is provided separately from the controller 170. However, the scope of the invention is not limited thereto. For example, the storage unit 140 may be included in the controller 170.

The user input interface 150 may deliver a signal input by a user to the controller 170, or deliver a signal from the controller 170 to the user.

For example, the user input interface 150 may receive a signal input by the user from the keyboard 121 or the mouse 122, and deliver the signal to the controller 170.

The controller 170 may control each unit in the PC 110 and overall operation of the computer system 100.

On the other hand, the controller 170 may perform a control operation to operate the computer system 100 in response to user input through the user input interface 150, and display an image corresponding to the operation of the computer system 100 on the connected display 180.

The controller 170 may process a video signal, an audio signal, and the like.

The video signal processed by the controller 170 may be input to the display 180 and then displayed as an image corresponding thereto. In addition, the video signal processed by the controller 170 may be input to an external output device through the external device interface 130.

The audio signal processed by the controller 170 may be output as a sound through the audio output unit 160. In addition, the audio signal processed by the controller 170 may be input to the external output device through the external device interface 130.

FIG. 2 illustrates an example in which the audio output unit 160 is provided in the PC 110. However, the scope of the invention is not limited thereto. For example, the audio output unit 160 may be provided separately from the PC 110.

On the other hand, the controller 170 may operate an operating system (OS) using data related to the OS which is stored in the storage unit 140. In addition, the controller 170 may execute various applications based on the OS. For example, the OS may be a Unix-based (or Linux-based) OS, a Windows-based OS, a Web-based OS, or the like.

The controller 170 may control electronic devices connected thereto either by wire or wirelessly. Upon detecting the connected electronic devices, the controller 170 may control the display 180 to display a dual control screen for a dual control mode in which the detected electronic devices may be controlled by the input device 120.

The display 180 may output a self-image of the computer system 100 or an image based on data received from an electronic device under control of the controller 170.

In addition, the display 180 may display the self-image of the computer system 100 together with an image linked to an electronic device.

The display 180 may be a wide screen having an aspect ratio of 21:9 which is favorable for reproduction of contents such as movies and multitasking operations with two or more windows simultaneously displayed.

The power supply 190 may supply power to the PC 110 and/or each unit of the computer system 100. To this end, the power supply 190 may include a converter that receives an input of alternating current (AC) power and converts the AC power into direct current (DC) power, and a DC/DC converter that converts a level of the DC power.

The block diagram of the computer system 100 shown in FIG. 2 is for one embodiment of the present invention. The respective components of the block diagram may be combined, added or omitted according to specifications of the computer system 100 which is actually implemented. In other words, as needed, two or more of these components may be combined into one component or one thereof may be subdivided into two or more components. In addition, the function performed by each block is intended for description of the present embodiment, and the detailed operation or device thereof does not limit the scope of the present invention.

FIGS. 3A to 14B are views referred to for describing a method of operating the computer system 100 according to the present embodiment.

Figure 3A:
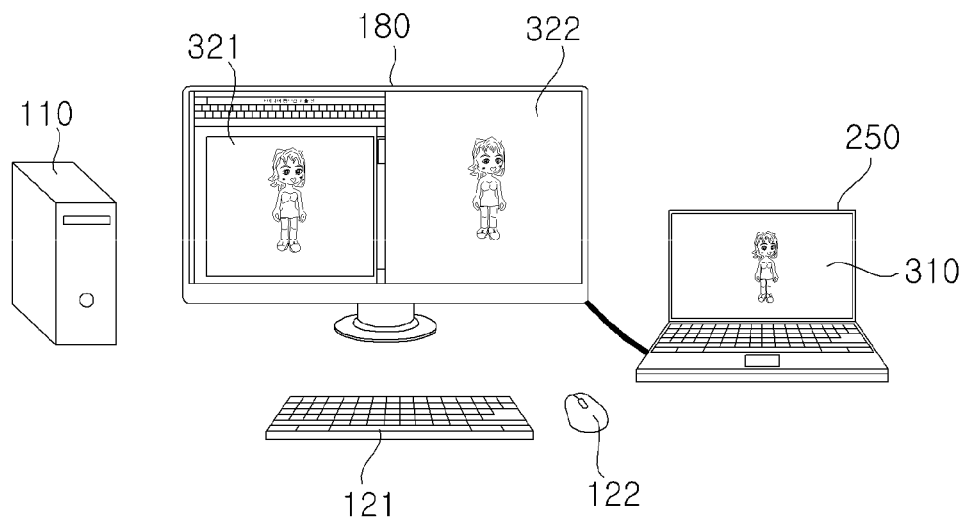
FIGS. 3A to 14B are views referred to for describing a method of operating the computer system according to the present embodiment.
Figure 3B:
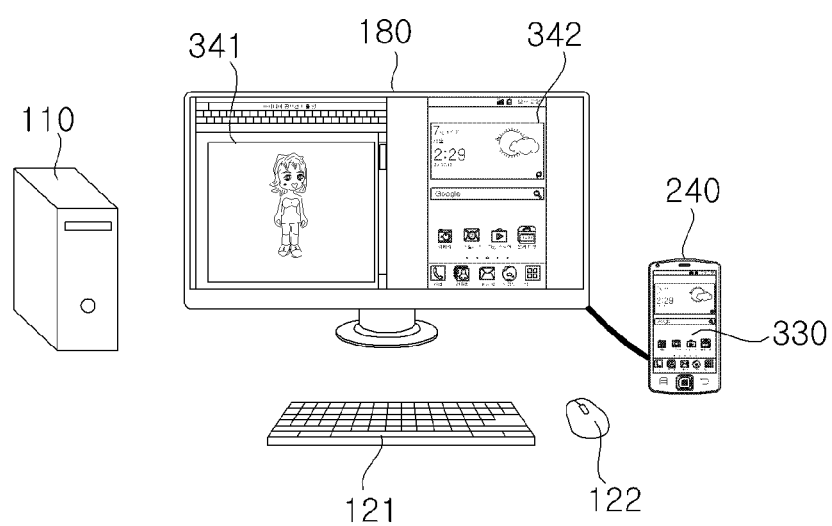

FIG. 3A illustrates an example in which a desktop PC system and the notebook computer 250 are connected through the network, and FIG. 3B illustrates an example in which the desktop PC system and the smartphone 240 are connected to each other.

Referring to FIGS. 2, 3A and 3B, the computer system 100 according to the present embodiment may include the PC 110, the display 180, and the input device 120 such as the keyboard 121 or the mouse 122, and the PC 110 may include the user input interface 150 connected to the input device 120, which includes at least one of the keyboard 121 and the mouse 122, the external device interface 130 for exchanging data with the external device, and the network interface 135 for connection to the wired/wireless network.

Alternatively, the display 180 may include at least one of the user input interface 150, the external device interface 130, and the network interface 135.

On the other hand, the computer system 100 according to the present embodiment and the electronic devices may operate in a content sharing mode.

Here, the content sharing mode may refer to a mode in which an electronic device may transmit a content to an external electronic device connected to the electronic device either by wire or wirelessly, or receive a content transmitted from the external electronic device.

In addition, the content sharing mode may include a mirroring mode in which connected electronic devices display the same picture, and a dual screen dual play (DSDP) mode in which one of a plurality of devices may use a content which is being reproduced by another device and perform another operation in the content sharing state.

For example, referring to FIG. 3A, the same image 322 as an image 310 of the notebook computer 250 may be displayed in one area of the display 180 based on data received from the notebook computer 250, and a graphic operation picture 321 may be displayed in another area of the display 180 based on the data received from the notebook computer 250.

Alternatively, referring to FIG. 3B, the same image 342 as an image 330 of the smartphone 240 may be displayed in one area of the display 180 based on data received from the smartphone 240, and a multitasking operation picture 341 unrelated to the smartphone 240 may be displayed in another area of the display 180.

On the other hand, the computer system 100 according to the present embodiment and the electronic devices may support published multimedia transmission technologies such as wireless fidelity (Wi-Fi) CERTIFIED Miracast™ introduced by Wi-Fi Alliance, WiFi Display, and Wireless Display (WiDi), and share a content according to standards thereof.

Data for content sharing may be directly transmitted to the external electronic device through wired/wireless communication according to various communication standards, or transmitted to the external electronic device through a separately connected Web server.

The computer system 100 according to the present embodiment may operate in the dual control mode to control electronic devices connected to the computer system 100, such as the notebook computer 250 and the smartphone 240, by operating the input device 120 connected to the computer system 100, such as the keyboard 121 or the mouse 122.

The controller 170 may set the keyboard 121 and the mouse 122 as input units of the notebook computer 250 and the smartphone 240.

The user may control the electronic devices such as the notebook computer 250 and the smartphone 240 by operating the keyboard 121 and the mouse 122 of the computer system 100 while viewing the same image 322 as the image 310 of the notebook computer 250, the same image 342 as the image 330 of the smartphone 240, and the like.

Upon receiving user input signals for operations of the keyboard 121 and the mouse 122, the controller 170 may perform a control operation to transmit data based on the received user input signals, for example, key/scroll/movement input signals of the keyboard 121 and the mouse 122, control commands corresponding to inputs of the keyboard 121 and the mouse 122, or edited data of the same image 322 as the image 310 of the notebook computer 250 and the same image 342 as the image 330 of the smartphone 240 based on the operations of the keyboard 121 and the mouse 122 to the connected electronic devices 240 and 250.

In this way, two or more electronic devices may be all controlled using one input device or input devices connected to one computer system, and a mouse may be moved seamlessly between electronic devices.

When electronic devices connected to the same network are detected, the controller 170 may control the display 180 to display the dual control screen for the dual control mode in which the detected electronic devices may be controlled by the input device 120.

In particular, according to a given setting, the controller 170 may automatically detect electronic devices connected to the same network or electronic devices in the dual control mode during in a booting of the computer system 100, and control the display 180 to display the dual control screen.

FIGS. 4 to 14B illustrate various examples of a user interface image according to the present embodiment.

Figure 4:
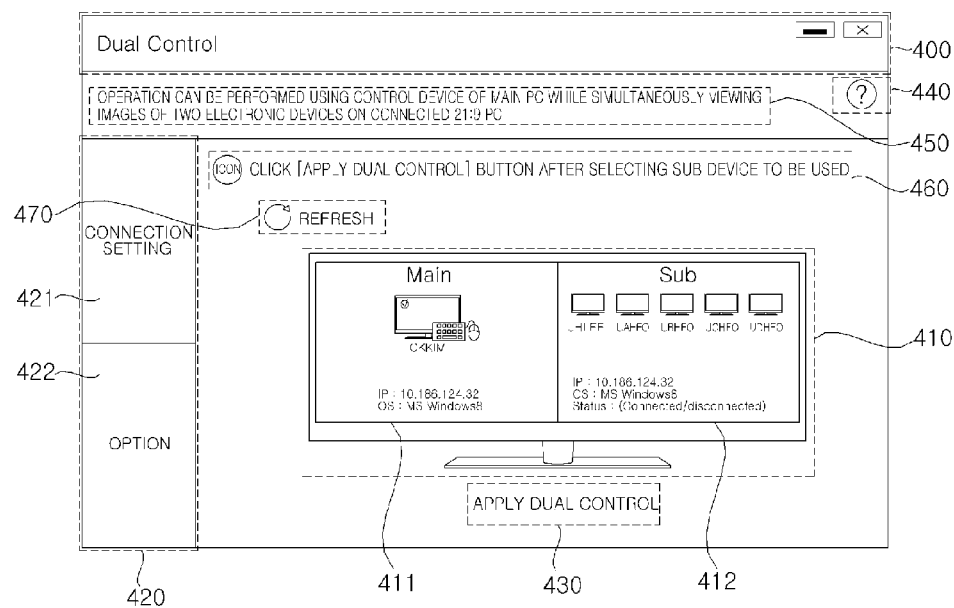

FIG. 4 illustrates an example of a dual control start screen when electronic devices to be used as a main electronic device and sub electronic devices are connected through the same network, for example, the same access point (AP).

The screen of FIG. 4 may be a first screen displayed after execution of a dual control application when an electronic device is entered in the dual control mode by the execution of the dual control application. The dual control application may be automatically executed during booting according to a given setting.

Referring to FIG. 4, the dual control screen may include a connected electronic device display area 410 that displays a main computer system that controls electronic devices and sub electronic devices that are controlled by the main computer system.

The controller 170 may perform a control operation to include a main area 411 that displays the main computer system and a sub area 412 that displays objects indicating the detected electronic devices in the connected electronic device display area 410, and display the electronic devices separately in the respective areas 411 and 412.

The sub area 412 is an area that displays electronic devices such as a connected PC. The sub area 412 may provide information varying depending on whether a condition is satisfied. The controller 170 may perform a control operation to change information displayed in the sub area 412 based on whether the detected electronic devices satisfy a predetermined condition.

In addition, when electronic devices connected to the display 180 or the external device interface 130 are detected, the controller 170 may control the dual control screen to display the electronic devices connected to the display 180 or the external device interface 130. That is, the electronic devices directly connected to the display 180 or the external device interface 130 may be displayed in the sub area 412.

The dual control screen may include a connection setting item 421 and an option item 422, and display a selected item having one of display states such as a color, a size, and a highlight effect different from those of the other items such that the selected item is distinguished from the other items.

In addition, the dual control screen may include a connection setting item screen and an option item screen corresponding to selections of the connection setting item 421 and the option item 422.

In this case, the dual control screen may be set to be changed from the connection setting item screen to the option item screen when the option item 422 is selected under the condition that the connection setting item screen is an initial screen.

The dual control screen may further include an application name and window size function button area 400. The dual control screen may be displayed in the entire area of the display 180, or displayed as a window having a certain size in a partial area of the display 180.

In addition, the dual control screen may further include a detailed help button 440 for execution of a help menu, and an information area 450 for provision of information about a purpose, a function, a state, and the like of the dual control application in a text form. The information area 450 and text displayed therein may continuously remain in a representative image.

The dual control screen may further include a detailed information area 460 in which usage guide texts and icons are displayed, and provide a guide for each operation condition as a graphic object such as text or an icon.

The dual control screen may further include a refresh button 470 that fetches a list of main and sub electronic devices based on a current network connection standard, and a dual control button 430 that allows a control device to be shared by linking two selected PCs to each other.

The controller 170 may perform a control operation to change information displayed in the sub area 412 based on whether the detected electronic devices satisfy the predetermined condition.

Here, the predetermined condition may include at least one of a user set priority, connection/disconnection between the detected electronic devices and another input device, connection/disconnection between the detected electronic devices and another display, a program driven by each of the detected electronic devices, and wired or wireless connection/disconnection to/from the network.

For example, when there is a priority set directly by the user, the controller 170 may display electronic devices sorted or arranged according to the user set priority.

In addition, the controller 170 may apply a condition based on whether the sub electronic devices are connected to another input device. An electronic device currently disconnected from the server 230 or another input device may have a high priority due to a great need for the input device of the main electronic device or the computer system 100.

Similarly, the controller 170 may apply a condition based on whether the sub electronic devices are connected to another display such as a monitor.

On the other hand, the controller 170 may perform a control operation to change displayed information based on whether a program driven in each of the sub electronic devices is linked to the main computer system. For example, when the main computer system is a PC for graphic operations, the controller 170 may perform a control operation to display associated information first at the time of executing or downloading a picture or a moving image in a sub PC.

In an example in which operation may be performed in the dual control mode due to execution of the dual control application, the controller 170 may perform a control operation to display information varying depending on whether the dual control application is installed and/or executed.

On the other hand, the controller 170 may apply a condition based on a network condition such as wired or wireless connection/disconnection between a sub electronic device and the network, and a network speed.

The controller 170 may perform a control operation to further display state information including at least one of information about a network connection state of each of the detected electronic devices and information about installation and driving of a dual control mode-related program.

The controller 170 may perform a control operation to transmit a response signal based on the state information to the detected electronic devices. That is, the controller 170 may perform a control operation to inform an electronic device of a detected state or to transmit a control signal for a state change.

FIGS. 5 to 8 illustrate examples in which the dual control screen displays certain information in different manners.

Figure 5:
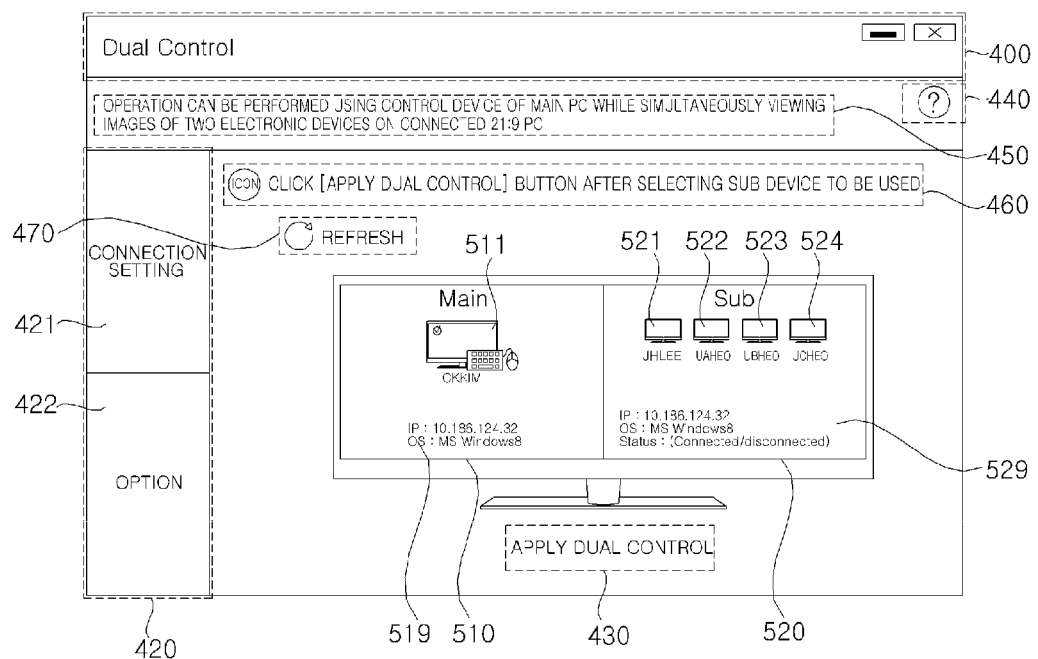

Referring to FIG. 5, the connected electronic device display area 410 may include a main area 510 that displays the main computer system and a sub area 520 that displays objects indicating the detected electronic devices.

An object 511 indicating the main computer system and main electronic device information 519 such as network information or OS information may be displayed in the main area 510. In addition, objects 521, 522, 523 and 524 indicating the sub electronic devices and sub electronic device information 529, such as network information or OS information of at least one of the sub electronic devices, may be displayed in the sub area 520.

The controller 170 may display information, in the main area 510 and the sub area 520, sorted or arranged based on whether a predetermined condition is satisfied.

For example, the objects 521, 522, 523 and 524 displayed in the sub area 520 may correspond to devices currently operable in the dual control mode or sub electronic devices having high priorities.

Figure 6:
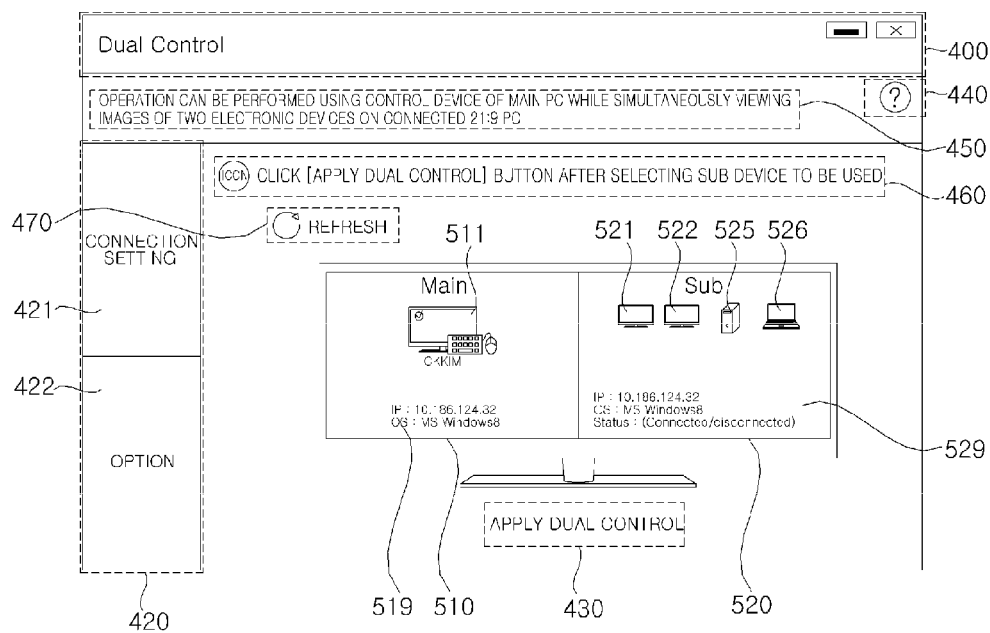

Referring to FIG. 6, the controller 170 may perform a control operation to display different graphic objects so as to instinctively recognize the objects 521 and 522 corresponding to a case in which a sub electronic device is connected to a display device of the sub electronic device and the object 523 corresponding to a case in which a sub electronic device is disconnected from a display device of the sub electronic device, and display a graphic object for intuitive indication of a type of an electronic device such as a notebook computer 526.

In addition, the controller 170 may group information according to a predetermined criterion and separately display the grouped information on the dual control screen.

Figure 7:
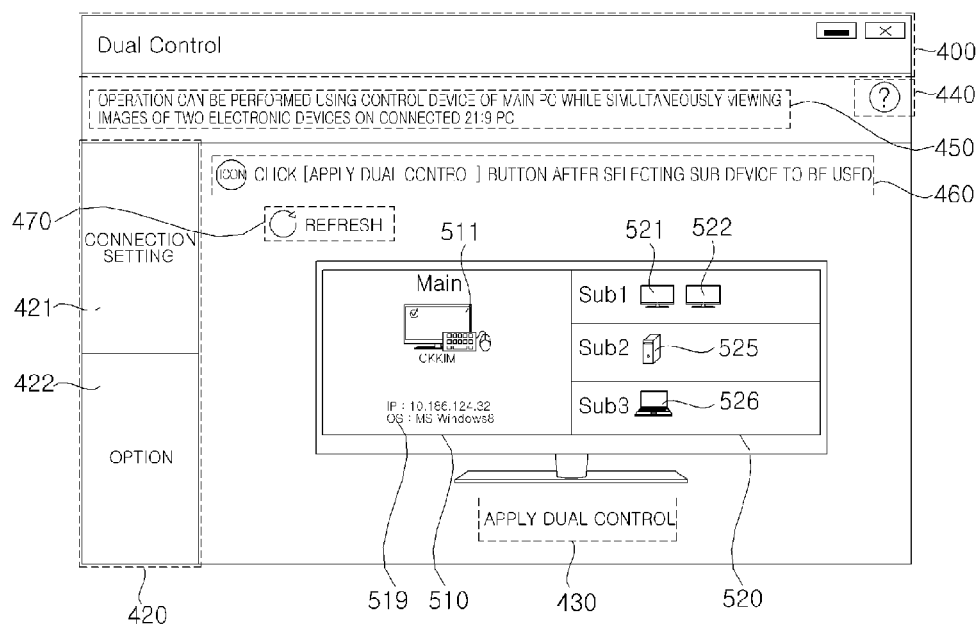

FIG. 7 illustrates an example in which the sub area 520 is subdivided into three areas and the same information as that of FIG. 6 is displayed separately in the subdivided areas.

Figure 8:
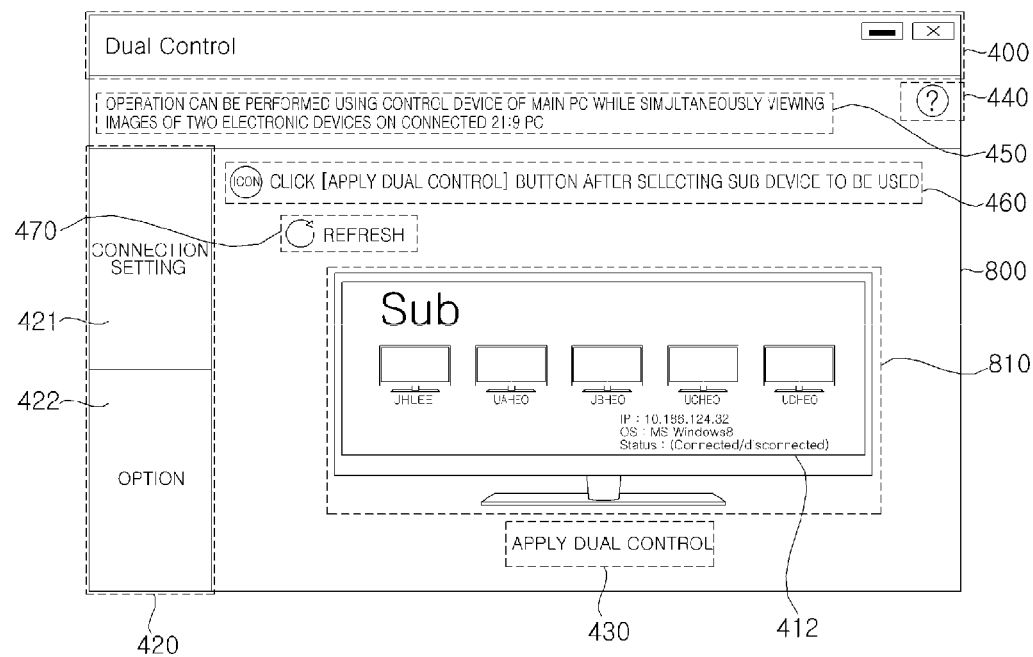

Referring to FIG. 8, a connected electronic device display area 810 included in a dual control screen 800 may not be divided into a main area that displays the main computer system and a sub area that displays the objects indicating the detected electronic devices.

As in an example illustrated in FIG. 8, only sub electronic devices may be displayed in the connected electronic device display area 810.

When an input for selection of an object among the objects indicating the detected electronic devices is received, the controller 170 may control to enter an electronic device corresponding to the selected object by the input device 120 in the dual control mode.

Figure 9:
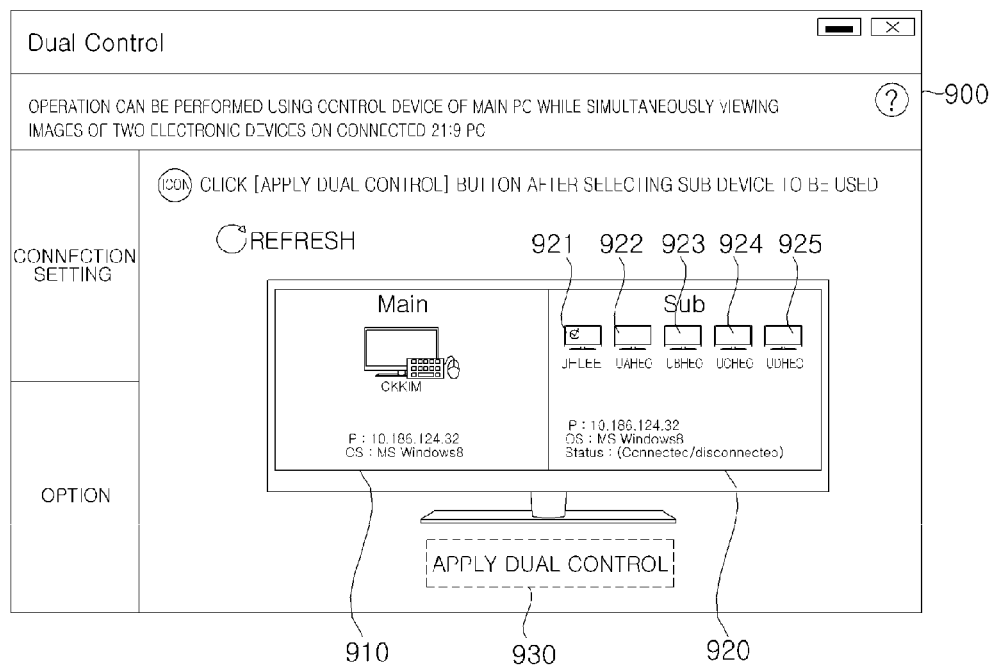

Referring to FIG. 9, the main computer system may be displayed in a main area 910 of a dual control screen 900. The main computer system may be the computer system 100 that executes the dual control application.

A list of a plurality of sub electronic device candidates corresponding to objects 921, 922, 923, 924 and 925 may be displayed in a sub area 920 of the dual control screen 900.

When an input for selection of one object 921 among the objects 921, 922, 923, 924 and 925 indicating the detected sub electronic device candidates is received, the controller 170 may perform a control operation such that the dual control mode, in which an electronic device corresponding to the selected object 921 may be controlled, is entered.

Here, the dual control mode may be executed by selecting one of the objects 921, 922, 923, 924 and 925 indicating the detected sub electronic device candidates and selecting a dual control button 930, or double clicking one of the objects 921, 922, 923, 924 and 925 indicating the detected sub electronic device candidates.

The controller 170 may perform a control operation to deactivate another input device connected to an electronic device 911 controlled in the dual control mode. That is, in the dual control mode, either an input device of the main electronic device and input devices of the sub electronic devices may be set to be used or only the input device of the main electronic device may be set to be operated.

When execution of the dual control application is selected in one of the sub electronic devices, the dual control button 930 may be deactivated not to allow selection of information about the main computer system even when the information is displayed in the sub electronic devices.

As described with reference to FIGS. 3A and 3B, the controller 170 may perform a control operation to display a sub screen, which is based on data received from the electronic device controlled in the dual control mode through the network interface 135, in at least a partial area of the display 180. Here, the sub screen may be an output image of the electronic device controlled in the dual control mode.

In addition, the controller 170 may perform a control operation to display a main screen of the computer system 100 in at least a partial area of the display 180 together with the sub screen.

Thereafter, the controller 170 may perform a control operation to transmit data which is based on a signal received from the input device 120 to the electronic device controlled in the dual control mode. The data which is based on the signal received from the input device 120 may include at least one of key input information of the input device 120, location information of a cursor during key input of the input device 120, and information about an item selected through the input device 120.

In this way, the computer system 100 may control the connected electronic device by operating the connected input device 120, for example, the keyboard 121 and the mouse 122.

The controller 170 may set the keyboard 121 and the mouse 122 connected to the PC 110 as input units of the sub electronic devices, and the user may control the sub electronic devices by operating the keyboard 121 and the mouse 122 of the computer system 100 while viewing the same image as those of the sub electronic devices through the display 180.

Figure 10:
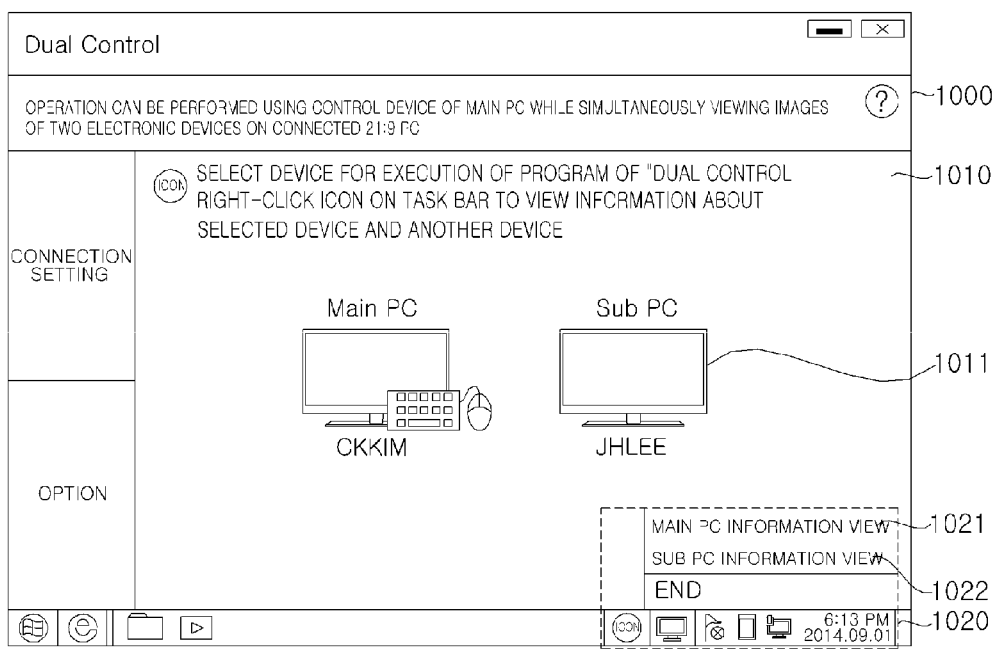

Alternatively, a dual control screen 1000 may further include an image for confirmation of a finally selected sub electronic device 1011 in a certain area 1010 as illustrated in FIG. 10.

The controller 170 may perform a control operation to display a menu of electronic devices not selected among the detected electronic devices in a partial area of the display 180.

For example, it is possible to provide options 1021 and 1022 for verification and change of information about the main/sub electronic devices in a dual control icon in a bottom tray 1020.

When a certain event occurs, an electronic device, which is not currently set as the sub electronic device, may be set as the sub electronic device or the event may be reported to the user.

For example, when a program executed in the main computer system is related to one of the sub electronic device candidates, and an operation such as a task reserved to be downloaded in the sub electronic device candidate is completed, information about the completion may be provided to the user.

The dual control screen may include a connection setting item screen and an option item screen corresponding to selections of the connection setting item 421 and the option item 422.

In this case, the dual control screen may be set to be changed from the connection setting item screen to the option item screen when the option item 422 is selected under the condition that the connection setting item screen is an initial screen.

Figure 11:
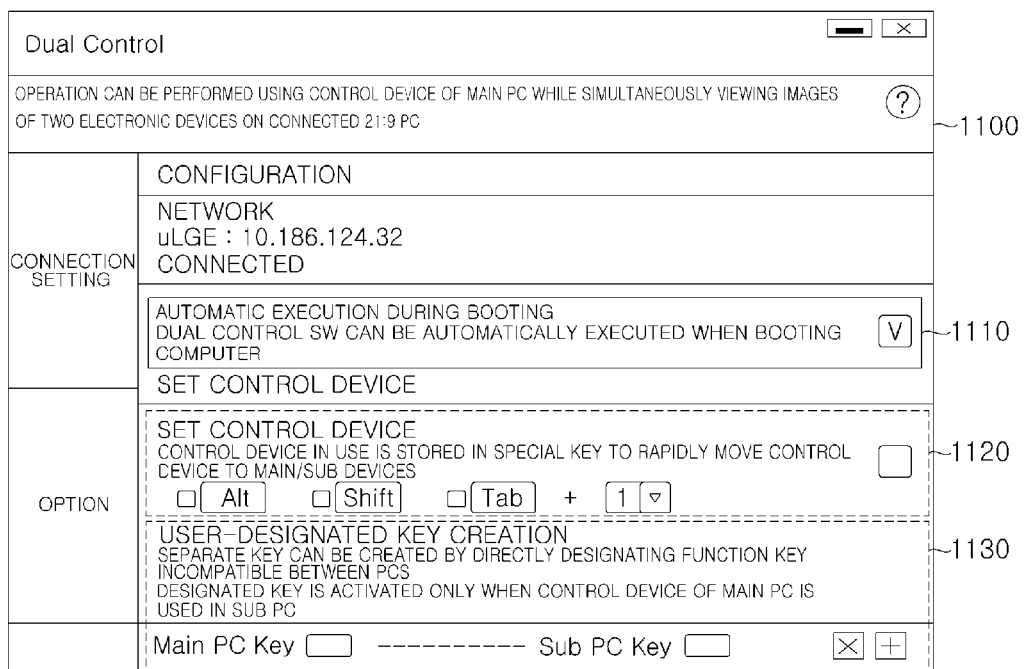

FIG. 11 illustrates an example of an option item screen 1100.

Referring to FIG. 11, the user may select an automatic execution item 1110 during booting such that the dual control application is automatically executed and the dual control screen is displayed during booting.

The dual control application may be set to be automatically executed only under a particular condition such as a case in which there is an electronic device connected to the same network or a case in which there is an electronic device connected to a monitor having an aspect ratio of 21:9 which is the same as that of the display 180.

Alternatively, the dual control application may be set to be automatically executed when another PC is connected to the network or to the display 180 having the aspect ratio of 21:9 after booting.

In a case in which a second PC uses a monitor of a first main PC as a full screen and then the first main PC, in which the dual control application is installed, is booted, a list of PCs connected to the same network as that of the first main PC may be set to be displayed when the dual control application is not executed in the second PC, or the second PC may be set to be displayed in a sub area first when the dual control application is executed in the second PC.

In addition, a network change may be induced when the second PC is executing the dual control application and is connected to a different network, or installation of the dual control application through the Internet may be induced when the dual control application is not installed in the second PC.

Referring to FIG. 11, the user may select a control device movement key item 1120 to create a hot key that rapidly moves the input device 120 such as the keyboard 121 or the mouse 122 used in the main computer system from the main computer system to the sub electronic devices.

That is, the user may use the input device 120 of the main computer system as an input device and then click the set hot key to rapidly change the input device 120 to an input device of a sub electronic device and move a mouse pointer to a changed device screen.

Referring to FIG. 11, the user may select a user-designated key creation menu item 1130 to create a separate input key.

When the main electronic device and the sub electronic devices have different types or OSs, an input device and an input key of one of the devices may not be present in the other one of the devices. In this case, a corresponding key input may be impossible.

Thus, the user may set a combination of keys having mapped functions activated by designation of the user in the user-designated key creation menu item 1130.

When the computer system 100 and the electronic device controlled in the dual control mode have different OSs, the controller 170 may perform a control operation to pop-up display a user-designated hot key candidate. The user may more easily create a user-designated key by selecting the pop-up-displayed candidate and selecting a mapping key.

Figure 12:
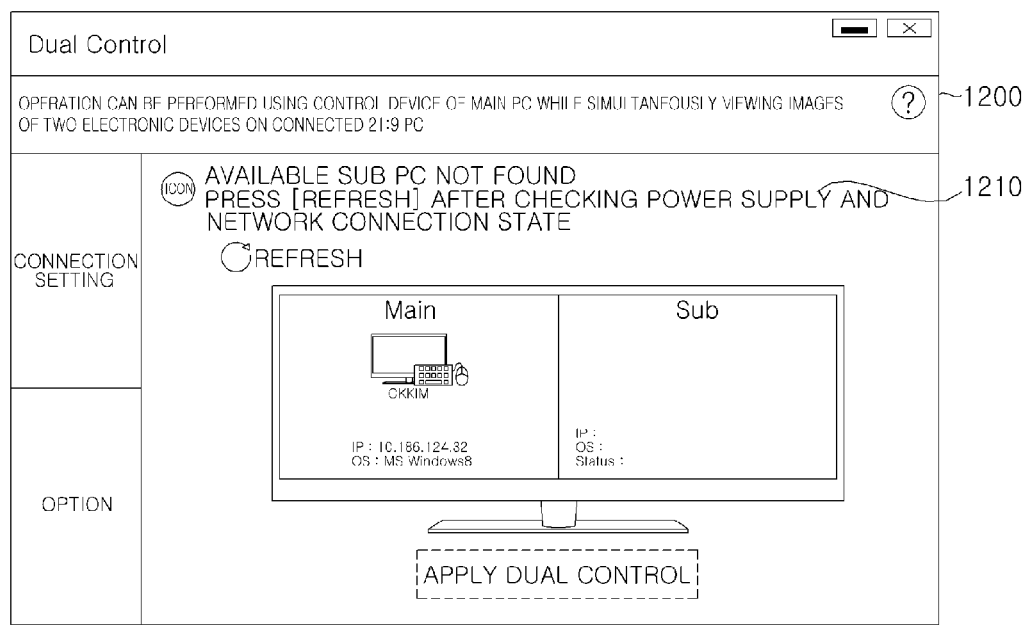

FIG. 12 illustrates a dual control screen 1200 displayed when an electronic device connected to the same network is not found or an electronic device executing the dual control application is absent.

In this case, the dual control screen 1200 does not display information about the sub electronic devices, and may provide a text guide 1210 such as "Available sub PC not found. Press [Refresh] after checking power supply and network connection state." at the top.

Figure 13A:
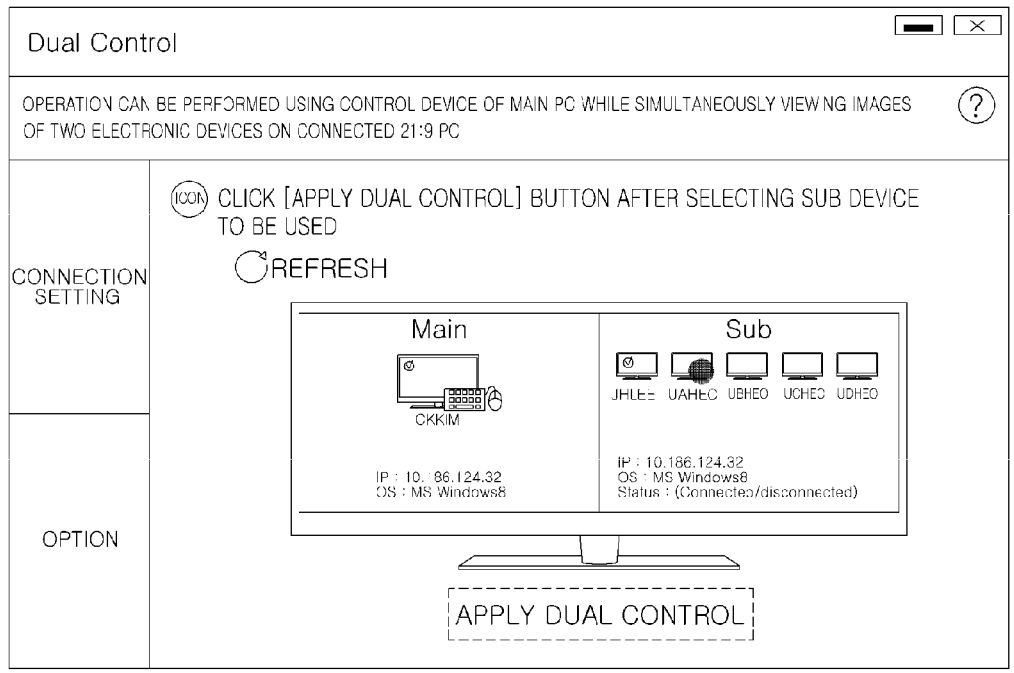
Figure 13B:
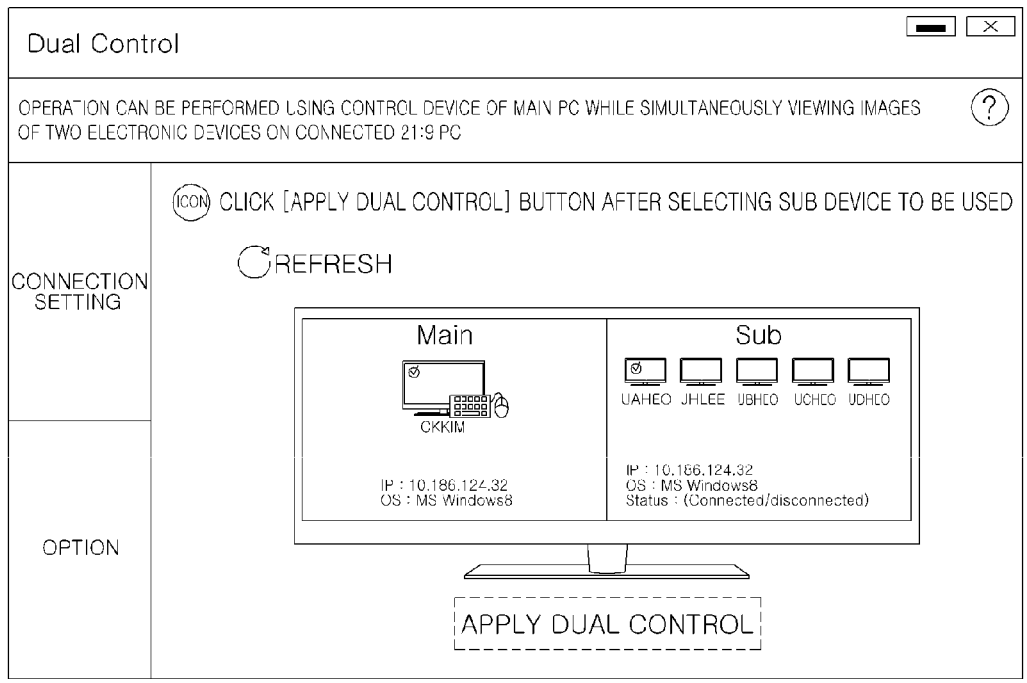

FIGS. 13A and 13B illustrate examples in which an order of arranged sub electronic devices is changed according to user selection.

When the user selects an electronic device displayed at a second position, the selected electronic device may be moved to a first position and the other electronic devices may be successively arranged after the first position.

Figure 14A:
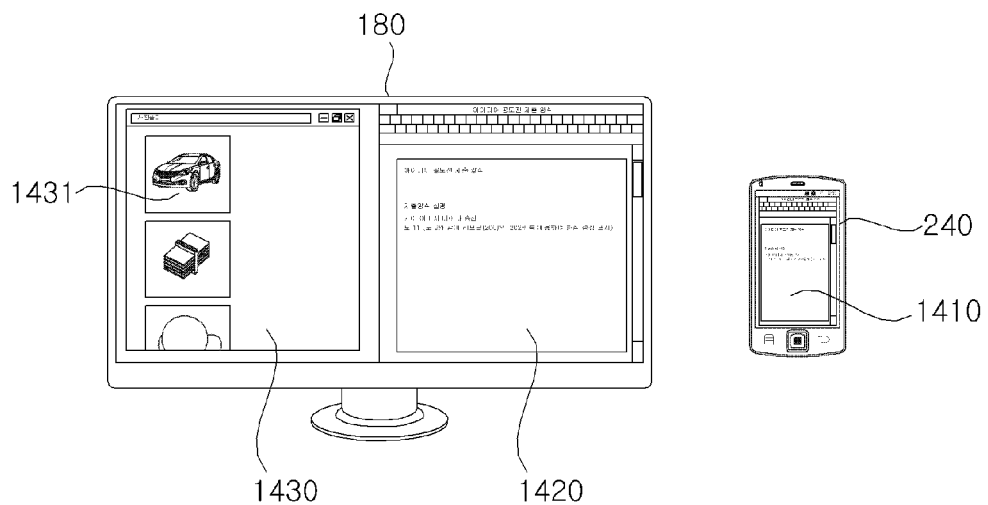
Figure 14B:
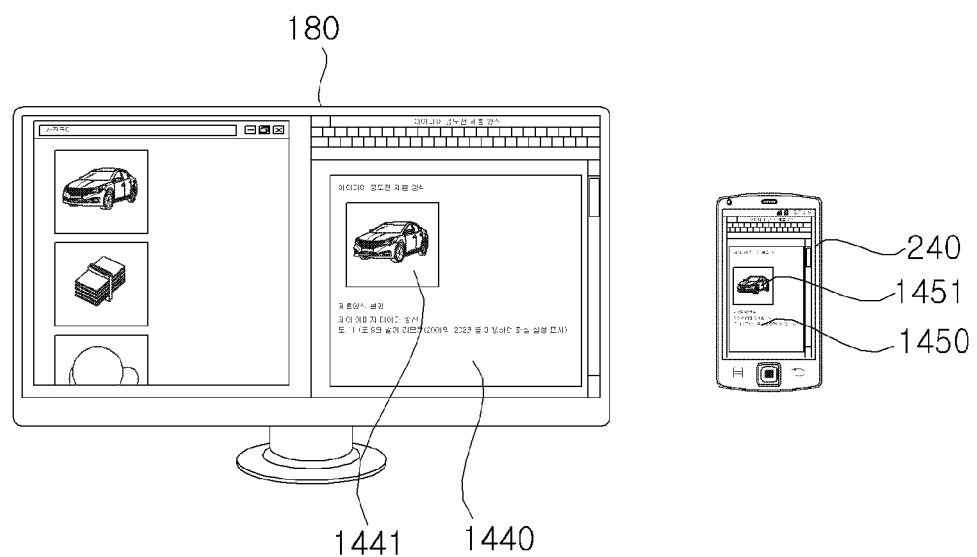

FIGS. 14A and 14B illustrate examples in which an operation is performed by connecting the desktop PC system to the smartphone 240.

Referring to FIGS. 14A and 14B, a word application image 1420 which is the same as an image of the smartphone 240 may be displayed in one area of the display 180 based on data received from the smartphone 240, and a multitasking operation image 1430 may be displayed in another area of the display 180.

The user may copy one image 1431 of a plurality of images in the multitasking operation image 1430, and insert the one image 1431 into the word application image 1420.

In addition, data based on the copy of the image may be transmitted to the smartphone 240, and the same image 1451 may be inserted into a word application image 1450 of the smartphone 240.

According to the embodiments of the present invention, it is possible to provide a user interface environment in which several electronic devices may be controlled by an input device used in one of the electronic devices and the other electronic devices may be easily controlled by the input device, thereby enhancing user convenience.

As is apparent from the above description, it is possible to provide a user interface environment in which several electronic devices may be controlled by an input device used in one of the electronic devices and the other electronic devices may be easily controlled by the input device, thereby enhancing user convenience.

The computer system and the method of operating the same according to the foregoing embodiments are not restricted to the embodiments set forth herein. Therefore, all or some of the embodiments may be selectively combined to variously change the embodiments.

The computer system and the method of operating the same according to the foregoing embodiments may be implemented as code that can be written to a processor (controller)-readable recording medium included in the computer system and can thus be read by a processor. The processor-readable recording medium may be any type of recording device in which data can be stored in a processor-readable manner. Examples of the processor-readable recording medium include a ROM, a RAM, a CD-ROM, a magnetic tape, a floppy disk, optical data storage, and a carrier wave (e.g., data transmission over the Internet). The processor-readable recording medium may be distributed over a plurality of computer systems connected to a network so that processor-readable code is written thereto and executed therefrom in a decentralized manner.

Although the preferred embodiments of the present invention have been disclosed for illustrative purposes, the present invention is not limited to the embodiments described above, and those skilled in the art will appreciate that various modifications are possible, without departing from the scope and spirit of the invention as disclosed in the accompanying claims. The modifications should not be understood separately from the technical spirit and perspective of the present invention.

What is claimed is:

1. A computer system comprising:
    a display;
    a user input interface connected to at least one input device;
    an external device interface for exchanging data with an external device;
    a network interface for connection to a wired or wireless network; and
    a controller for, when electronic devices connected to a same network are detected in a booting, controlling the display to display a dual control screen for a dual control mode for control of the detected electronic devices through the input device,
    wherein the dual control screen includes a connection setting item screen and an option item,
    wherein the connection setting item screen is an initial screen, and the dual control screen is changed from the connection setting item screen to an option item screen when the option item is selected,
    wherein the option item screen includes a user-designated hot key creation menu, and
    wherein the controller performs a control operation to pop-up display a user-designated hot key candidate when the computer system and the electronic device controlled in the dual control mode have different operating systems.

2. The computer system according to claim 1, wherein the controller performs a control operation such that the dual control screen displays an electronic device connected to the display or the external device interface when the electronic device connected to the display or the external device interface is detected.

3. The computer system according to claim 1, wherein the dual control screen includes a sub area for displaying objects indicating the detected electronic devices.

4. The computer system according to claim 3, wherein the controller performs a control operation to change information displayed in the sub area based on whether the detected electronic devices satisfy a predetermined condition.

5. The computer system according to claim 4, wherein the predetermined condition includes at least one of a user set priority, connection/disconnection between the detected electronic devices and another input device, connection/disconnection between the detected electronic devices and another display, a program driven by each of the detected electronic devices, and wired or wireless connection/disconnection to/from the network.

6. The computer system according to claim 4, wherein state information is further displayed in the sub area, the state information including at least one of information about a network connection state of each of the detected electronic devices and information about installation and driving of a dual control mode-related program.

7. The computer system according to claim 6, wherein the controller performs a control operation to transmit a response signal based on the state information to the detected electronic devices.

8. The computer system according to claim 3, wherein the controller, when an input for selection of one of the objects is received, controls to enter the dual control mode for control of an electronic device corresponding to the selected object through the input device.

9. The computer system according to claim 8, wherein the controller performs a control operation to deactivate another input device connected to the electronic device controlled in the dual control mode.

10. The computer system according to claim 8, wherein the controller performs a control operation to display a sub screen based on data received from the electronic device controlled in the dual control mode through the network interface in at least a partial area of the display.

11. The computer system according to claim 10, wherein the sub screen is an output screen of the electronic device controlled in the dual control mode.

12. The computer system according to claim 10, wherein the controller performs a control operation to display a main screen of the computer system in at least the partial area of the display together with the sub screen.

13. The computer system according to claim 8, wherein the controller performs a control operation to transmit data based on a signal received from the input device to the electronic device controlled in the dual control mode.

14. The computer system according to claim 13, wherein the data based on the signal received from the input device includes at least one of key input information of the input device, location information of a cursor during key input of the input device, and information about an item selected through the input device.

15. The computer system according to claim 8, wherein the controller performs a control operation to display a menu of electronic devices not selected among the detected electronic devices in a partial area of the display.

16. The computer system according to claim 1, wherein the display has an aspect ratio of 21:9.

\* \* \* \* \*